United States Patent [19]

Schron et al.

[11] Patent Number: 4,511,127

[45] Date of Patent: Apr. 16, 1985

[54] HYDRAULIC-MECHANICAL CLAMPING DEVICE

[75] Inventors: Jack H. Schron, Chagrin Falls; Lawrence H. Seidel, Mentor, both of Ohio

[73] Assignee: Jergens, Inc., Cleveland, Ohio

[21] Appl. No.: 485,861

[22] Filed: Apr. 18, 1983

[51] Int. Cl.[3] .............................................. B23Q 3/08

[52] U.S. Cl. ...................................... 269/32; 269/234

[58] Field of Search ................ 269/232, 234, 229, 32, 269/93, 138

[56] References Cited

U.S. PATENT DOCUMENTS

| | | | |
|---|---|---|---|
| 3,170,322 | 2/1965 | Cavanaugh | 269/234 |
| 3,802,688 | 4/1974 | Rolke et al. | 269/234 |
| 4,365,792 | 12/1982 | Johns . | |

*Primary Examiner*—Robert C. Watson
*Attorney, Agent, or Firm*—Pearne, Gordon, Sessions, McCoy, Granger & Tilberry

[57] ABSTRACT

A self-locking hydraulic clamping device includes a hydraulic piston which is notched on one side to form a compound camming surface which drivingly engages a spring-loaded clamping pin moving in a bore normal to the bore in which the hydraulic piston moves, the latter bore preferably extending parallel to the side of the workpiece being clamped.

4 Claims, 6 Drawing Figures

HYDRAULIC-MECHANICAL CLAMPING DEVICE

This invention relates to hydraulically operated clamping devices, and particularly to hydraulic clamping devices intended to be used to securely anchor stamping dies or other dies or mold plates in position on their press bolster plates or other mounting means under the tremendous mechanical shocks imposed by stamping operations or the like, and yet allow ready release and exchange of dies or mold plates so as to reduce changeover times and thereby improve the economics of short production runs.

In all such applications, several clamps may be distributed around the periphery of the piece to be anchored, and may be simultaneously actuated or released by appropriate application of pressure to one side or the other of a double-acting hydraulic actuator.

The invention can also be used in other similar applications, for example, to actuate hold-down clamps in machine shop fixture set-ups.

It is very desirable that clamping devices for such applications be self-locking so that, even if hydraulic pressure fails, they will hold under the tremendous shocks to which they are subjected. However, self-locking hydraulic clamping devices of the prior art have generally been relatively complex and have used up a good deal of the width of the work bed or press bolster plate or the like, thus minimizing the size of the die or mold plate which is to be clamped.

The present invention improves over self-locking hold-down clamping devices of the prior art by providing simplified construction and by reducing space requirements. These advantages are realized through the use of compound cam surfaces which provide compound clamp actuation in such a way that cam advance proceeds from (1) a non-self-locking rapid advance phase which requires relatively little piston movement per unit of clamp advance and (2) a self-locking slow advance phase which requires increased piston movement per unit of clamp advance only at the final portion of clamp advance. According to the present invention, space requirements may be further reduced by providing a notched-shank double-ended piston which moves transversely, i.e., parallel to the side of the workpiece, rather than moving in and out toward and away from the workpiece, with the compound cam surfaces formed in the notch of the shank.

The invention will be better understood from the following detailed description. In the drawings.

Figure 1:
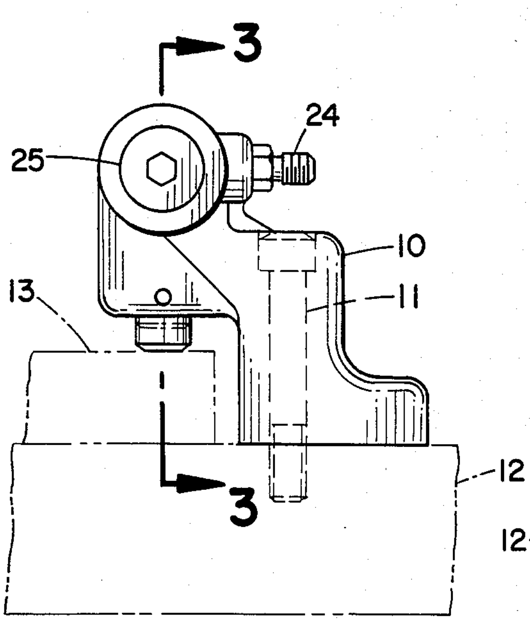
FIG. 1 is a side elevation of a clamp embodying the invention.

As can be seen in the drawings, a clamping device is provided having a body 10 fixed to a press bolster plate 12 or the like by suitable hold-down means such as hold-down bolts 11 or T bolts cooperating with T slots (not shown). The clamp is designed to releasably lock-down a die or mold plate 13 or the like and may be actuated simultaneously with a number or other similar clamps situated around the periphery of the element 13.

Formed in the body 10 is a primary bore 14 extending from side end to side end of the body, and a secondary bore 15 intersecting the primary bore and extending normally to the primary bore and from the primary bore to a face of the body which is intermediate the side end.

A piston 16 is slidably received in the primary bore 14 and is provided with suitable hydraulic plugs 25 and O-rings 26 which seal each end of the primary bore 14 to form piston chambers 21 and 22 each of which is supplied by a hydraulic port 23 leading from one of the hydraulic fittings 24.

One side of the piston 16 is notched to form a steeply angled cam face 31 and a shallowly angled cam face 32, which together form a compound camming surface which is positioned to pass back and forth over the secondary bore 15 as the piston itself moves back and forth, so that the two different stages of the compound camming surface are presented to the secondary bore during the back and forth movement. A clamping pin 36 is positioned in the secondary bore 15 and includes a head portion 38 and a shank 39. The head 38 slides in the secondary bore 15 and the shank 39 slides in a bushing 40 mounted at the lower end of the secondary bore 15. The shank 39 is provided with a key slot 42 which receives a key pin 44. A spring 41 urges the clamping pin into following engagement with the compound camming surface.

The head 38 is preferably provided with a follower roller 57 provided in a slot or pocket 55 and rotatably mounted on an axle pin 59 which extends from side to side of the head 38. These latter three elements are shown in phantom in FIG. 3 but are illustrated as included in the head 38 in FIG. 3A. However, less preferably, the head can rely on follower faces instead of the roller for following action. Thus, the steeply angled follower face 51 may be relied on for following action with the steeply angled cam face 31, and the shallowly angled follower face 52 may be relied on for following action with the shallowly angled cam face 32. With such an arrangement, of course, the roller 57 and the slot or pocket 55 and axle pin 59 may be eliminated. When the roller 57 is used, the faces 51 and 52 do not act as follower faces, and may have any shape, provided that the roller is properly exposed to the compound cam provided by the faces 31 and 32. Thus, for example, the face 52 may be replaced by a horizontal face when the follower roller 57 is employed.

Figure 3:
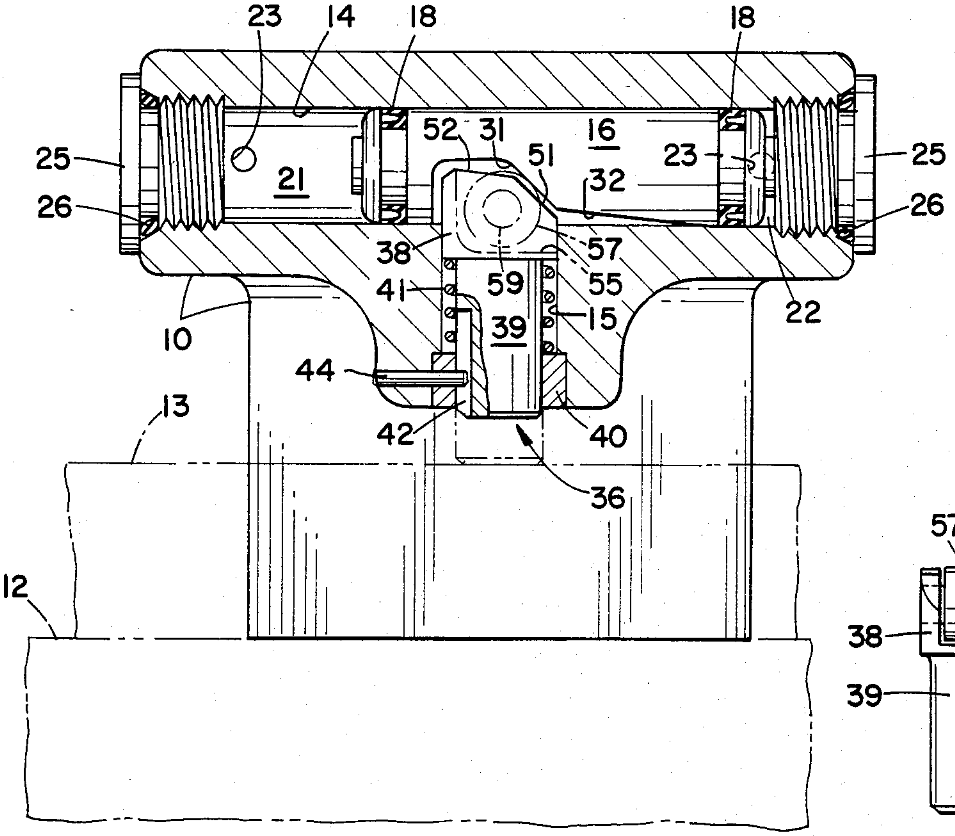
FIG. 3 is a section on an enlarged scale taken in the plane of line 3—3 in FIG. 1.
Figure 3A:
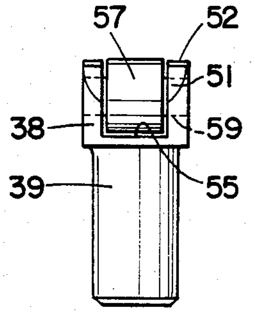
FIG. 3A is an end elevation of the clamping pin seen in FIG. 3 and with a roller provided as the follower means.

Operation of the clamp is as follows. With the clamp in raised or unclamped position as seen in FIG. 3, a workpiece 13 is placed under the clamp and under any associated clamps placed elsewhere on the bolster plate 12. Pressurized hydraulic fluid is then introduced through the associated connector 24 and port 23 into the piston chamber 22. As the piston 16 moves to the left as seen in FIG. 3, the pin 36 is moved downwardly in following engagement with the compound camming surface of the piston. The first stage of this downward movement is a non-self-locking rapid advance phase which requires relatively little piston movement per unit of clamp advance. This is true whether the following engagement is by the steeply angled follower face 51 or by provision of a roller such as 57. During this first phase, following engagement is with the steeply angled cam face 31.

Continued movement of the piston 16 to the left as seen in FIG. 3 brings the parts to a self-locking slow advance phase which requires increased piston movement per unit of clamp advance, the following engagement now being with the shallowly angled cam face 32. When a roller such as 57 is not provided, the following engagement is by the shallowly angled follower face 52 in the slow advance phase, but, if provided, the roller 57 can serve as the slow advance follower. Thus relatively little motion of the piston 16 is required in the initial portions of the advance of the clamping pin 36 and increased piston movement is required only in the self-locking slow advance phase at the final stage of clamp advance.

It will be noted that the piston moves transversely, i.e., parallel to the side of the workpiece, rather than moving in and out toward and away from the workpiece, and the notching forming the compound cam surfaces 31, 32 is at the intermediate portions of this transversely moving piston. This configuration further reduces space requirements of the clamp and provides a compact, reliable, and simple clamping device.

When the clamp advances sufficiently to clampingly engage the clamping pin 36 against the workpiece 13, the clamp remains positively locked downwardly by the engagement of the face 52 or the roller 57 with the shallowly angled cam face 32. The positively locked clamp will remain locked even if hydraulic pressure fails, and even under the pounding of a stamping press or the like. If desired, hydraulic check valves can be provided at the hydraulic fittings 24 to provide yet an additional safeguard against loss of hydraulic pressure.

Despite the non-yielding self-locking action of the clamping pin in the advanced condition, it is readily released by actuation of the piston 16 in the retraction direction through introduction of pressurized hydraulic fluid into piston chamber 21 through the associated fitting 24 and port 23.

When it is desired to change workpieces, the illustrated clamp and other associated clamps can be readily released in unison, allowing quick replacement of a die or the like and subsequent reclamping, so that easy and economical changeover may be accomplished between production runs, thus making shorter production runs more economically viable.

Figure 4:
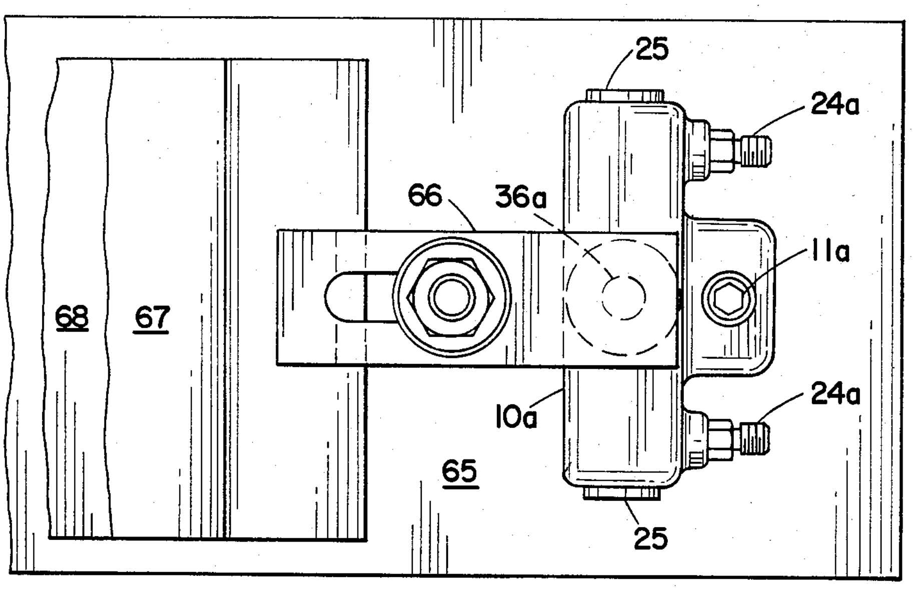
FIG. 4 is a plan view of another device embodying the invention and used as an actuation for a hold-down clamp in a fixture set-up.
Figure 5:
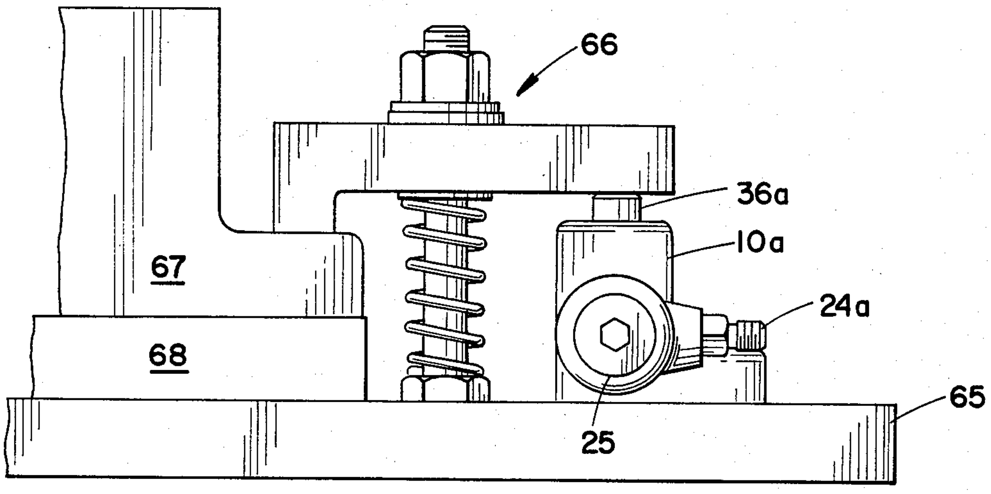
FIG. 5 is a side elevation of the set-up seen in FIG. 4.

In FIGS. 4 and 5, an actuator having a body **10*a* is mounted on a fixture base 65. The actuator drives a conventional hold-down clamp 66 to hold a workpiece 67 supported on a fixture 68**.

Figure 2:
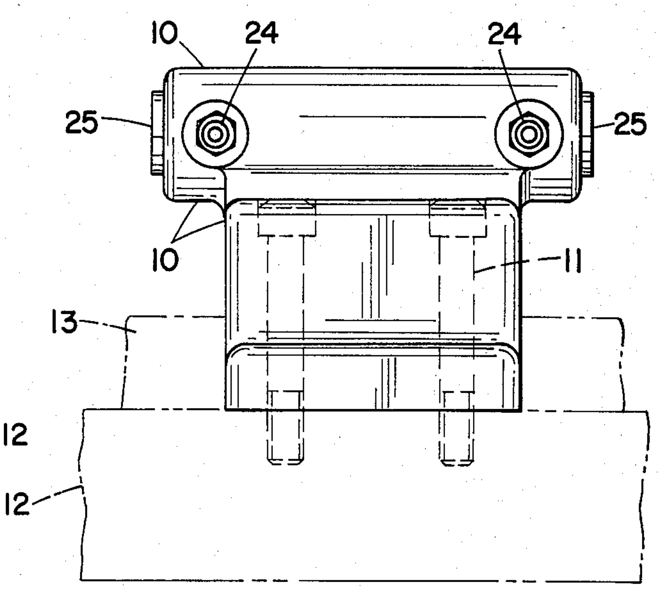
FIG. 2 is a rear elevation of the same clamp.

In this actuator, a clamping pin **36*a* operates at a face which is at the top of the body 10*a*, rather than at a bottom face as in the case of the clamping pin 36 in FIGS. 1–3. As can be seen, the shape of the body 10*a* differs from that of body 10, and only a single hold-down bolt 11*a* is provided, rather that the pair of bolts used to hold down the body 10 of FIGS. 1–3. Otherwise, the parts of the actuator of FIGS. 4 and 5 may be identical to the clamp of FIGS. 1–3. Thus, the fittings 24*a* may be identical to fittings 24, the plugs 25*a* may be identical to the plugs 25, the clamping pin 36*a* may be identical to clamping pin 36**, and so forth. All interior unseen parts may be similarly identical.

The actuator of FIGS. 4 and 5 has advantages of compactness and simplicity, comparable to those of the clamp of FIGS. 1–3, and operates in a similar manner, except that the element being clamped is not directly contacted by the clamping pin **36*a* but rather by the hold-down clamp 66**.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A compact self-locking hydraulic clamping device comprising a body, a primary bore extending from an end of said body, a secondary bore intersecting said primary bore intermediately and extending normally to said primary bore from said primary bore to a face of said body, a piston slidably received in said primary bore and including a shank passing back and forth past the intersection between the primary and secondary bores, piston chamber defining means associated with said primary bore, compound camming surface means extending non-reentrantly across one side of said piston shank and positioned to pass back and forth over said secondary bore during said back and forth movement of said piston to present different stages of said compound camming surface means, a clamping pin in said secondary bore, said pin being biased toward said camming surface means by a spring located in said secondary bore, a key preventing rotation of said clamping pin with respect to said body, follower means on the inner end of said clamping pin, said follower means engaging said compound camming surface in following relationship, said compound camming surface including a first stage which wedges said follower means and clamping pin relatively rapidly and in a non-self-locking manner during the earlier part of the piston's movement in the pin-extending direction, said compound camming surface including a second stage which wedges said follower means and clamping pin relatively slowly and in a self-locking manner during the latter part of the piston's movement in the pin-extending direction.

2. A device as in claim 1, said first stage of said compound camming surface means comprising a relatively steeply angled cam face, said second stage of said compound camming surface means comprising a relatively shallowly angled cam face, said follower means including means to followingly engage said relatively steeply angled cam face and also including a follower face angled correspondingly to said shallowly angled cam face and adapted to be slidingly wedgingly engaged thereby in said self-locking manner.

3. A device as in claim 1, said first stage of said compound camming surface means comprising a relatively steeply angled cam face, said second stage of said compound camming surface comprising a relatively shallowly angled cam face, said follower means including a follower roller to followingly engage said relatively steeply angled cam face in said non-self-locking manner and then to followingly engage said shallowly angled cam face in said self-locking manner as said piston moves in the pin-extending direction.

4. A relatively compact mechanically self-locking quick-acting hydraulic clamping device comprising a body, a primary bore extending through said body from one end to the other, a secondary bore intersecting said primary bore and extending normally to said primary bore from a central portion thereof to a side face of said body, a double-ended piston slidably received in said primary bore and passing back and forth past the intersection between the primary and secondary bores, means defining a piston chamber at each end of said primary bore, compound camming surface means on one side of said piston between the ends thereof and positioned to pass back and forth over said secondary bore during said back and forth movement of said piston to present different stages of said compound camming surface means, a clamping pin in said secondary bore, said pin being spring-biased toward said camming surface means, follower means on the inner end of said clamping pin, said follower means engaging said compound camming surface in following relationship, said compound camming surface including a first stage which wedges said follower means and clamping pin relatively rapidly and in a non-self-locking manner during the earlier part of the piston's movement in the pin-extending direction, said compound camming surface also including a second stage which wedges said follower means and clamping pin relatively slowly and in a self-locking manner during the latter part of the piston's movement in the pin-extending direction.

* * * * *